United States Patent
Kim et al.

(10) Patent No.: US 9,354,705 B2
(45) Date of Patent: May 31, 2016

(54) INTEGRATED HAPTIC FEEDBACK SIMULATING DEVICE USING KINESTHESIA PROVIDING MODULE INCLUDING MAGNETORHEOLOGICAL FLUID AND THIN-FILM-TYPE TACTILE SENSATION PROVIDING MODULE

(71) Applicant: Yeonhab Precision Co., Ltd, Cheonsan-si, Chungcheongnam-do (KR)

(72) Inventors: Bonggu Kim, Cheonan-si (KR); Soungbo Sim, Asan-si (KR); Seoknam Kim, Gwangmyeong-si (KR); Sang-Youn Kim, Seoul (KR)

(73) Assignee: Yeonhab Precision Co., Ltd., Cheonan-si (KR)

( * ) Notice: Subject to any disclaimer, the term of this patent is extended or adjusted under 35 U.S.C. 154(b) by 0 days.

(21) Appl. No.: 14/817,671

(22) Filed: Aug. 4, 2015

(65) Prior Publication Data

US 2016/0054800 A1  Feb. 25, 2016

(30) Foreign Application Priority Data

Aug. 25, 2014 (KR) .......................... 10-2014-0110747

(51) Int. Cl.
*G06F 3/01* (2006.01)
*G06F 3/0346* (2013.01)

(52) U.S. Cl.
CPC ................ *G06F 3/016* (2013.01); *G06F 3/014* (2013.01); *G06F 3/017* (2013.01); *G06F 3/0346* (2013.01); *G06F 2203/0331* (2013.01)

(58) Field of Classification Search
CPC .......... G06F 3/016; G06F 3/014; G06F 3/017
See application file for complete search history.

(56) References Cited

U.S. PATENT DOCUMENTS

| | | | |
|---|---|---|---|
| 2002/0021277 A1* | 2/2002 | Kramer | ................... G06F 3/016 345/156 |
| 2011/0282253 A1* | 11/2011 | Menon | ................... B25J 9/0006 601/40 |
| 2014/0232646 A1* | 8/2014 | Biggs | ...................... G06F 3/016 345/156 |

FOREIGN PATENT DOCUMENTS

| | | |
|---|---|---|
| KR | 10-2003-0024358 A | 3/2003 |
| KR | 10-2009-0064968 A | 6/2009 |
| KR | 10-2013-0125543 A | 11/2013 |
| KR | 10-2014-0000800 A | 1/2014 |

* cited by examiner

*Primary Examiner* — Dwayne Bost
*Assistant Examiner* — Sepehr Azari
(74) *Attorney, Agent, or Firm* — Jefferson IP Law, LLP (57) ABSTRACT

An integrated haptic feedback simulating device using a kinesthesia providing module including a magnetorheological fluid and a thin-film-type tactile sensation providing module. The integrated haptic feedback simulating device includes a motion controlling section providing kinesthetic feedback and tactile feedback to a hand of a user, a system controlling section detecting motions of the hand and providing an integrated haptic feedback control signal to the motion controlling section, and a display section visually rendering a graphic object according to the detected motions of the hand. The integrated haptic feedback simulating device can provide synesthetic haptic feedback to the user in cooperation with a graphic interface displayed on the display section, thereby increasing the virtuality of the graphic object simulated on the display section.

6 Claims, 5 Drawing Sheets

INTEGRATED HAPTIC FEEDBACK SIMULATING DEVICE USING KINESTHESIA PROVIDING MODULE INCLUDING MAGNETORHEOLOGICAL FLUID AND THIN-FILM-TYPE TACTILE SENSATION PROVIDING MODULE

CROSS-REFERENCE TO RELATED APPLICATION(S)

This application claims the benefit under 35 U.S.C. §119 (a) of a Korean patent application filed on Aug. 25, 2014 in the Korean Intellectual Property Office and assigned Serial number 10-2014-0110747, the entire disclosure of which is hereby incorporated by reference.

TECHNICAL FIELD

The present invention relates to an integrated haptic feedback simulating device. More particularly, the present invention relates to an integrated haptic feedback simulating device using a kinesthesia providing module including a magnetorheological fluid and a thin-film-type tactile sensation providing module.

BACKGROUND

Haptics refers to a technology that allows a user to feel sensations such as a touch, a force, and the like by means of an input device, such as a keyboard, a mouse, a joystick, and a touchscreen. The term "haptics" is derived from a Greek adjective "haptesthai" meaning "touching." Haptics is also referred to as "computer touch technology."

In order to provide a haptic feedback to a user, a mechanical module such as an actuator can be used. For example, the actuator is operated by a source of energy, such as electric current, hydraulic fluid pressure, or pneumatic pressure, and converts that energy into a sort of motion. Recently, a number of actuators equipped on the body of a user to provide a tactile sensation has been developed. In actuators intended to provide a tactile sensation that have been developed up to present, a vibration motor, a hydraulic or pneumatic pump, or the like is used to provide the tactile sensation to the user's body in most cases (see Korean Patent Application Nos. 10-2001-0057470 and 10-2007-0132361).

In the field of actuators of the related art, studies have only focused on improving the feedback of tactile sensation, force, or kinesthesia that each actuator provides. However, technology that can be properly applied for users, in which haptic modules provide different types of haptic feedback, has not been proposed. Furthermore, an integrated interface system for educating a user while providing a variety of haptic feedback has not been proposed.

The information disclosed in the Background of the Invention section is only for the enhancement of understanding of the background of the invention, and should not be taken as an acknowledgment or as any form of suggestion that this information forms a prior art that would already be known to a person skilled in the art.

RELATED ART DOCUMENT

Patent Document 1: Korean Patent Application No. 10-2001-0057470
Patent Document 2: Korean Patent Application No. 10-2007-0132361

SUMMARY

Accordingly, the present invention has been made keeping in mind the above problems occurring in the related art, and the present invention is intended to propose an integrated haptic feedback simulating device using a kinesthesia providing module including a magnetorheological fluid and a thin-film-type tactile sensation providing module. More particularly, the integrated haptic feedback simulating device includes a motion controlling section providing kinesthetic feedback and tactile feedback to a hand of a user, a system controlling section detecting motions of the hand and providing an integrated haptic feedback control signal to the motion controlling section, and a display section visually rendering a graphic object according to the detected motions of the hand, such that the integrated haptic feedback simulating device can provide synesthetic haptic feedback to the user in cooperation with a graphic interface displayed on the display section, thereby increasing the virtuality of the graphic object simulated on the display section.

Also provided is an integrated haptic feedback simulating device using a kinesthesia providing module including a magnetorheological fluid and a thin-film-type tactile sensation providing module that can be applied to educational programs that require visual, tactile, and kinesthetic feedback, thereby maximizing educational effects to the user.

In order to achieve the above object, according to one aspect of the present invention, there is provided an integrated haptic feedback simulating device including: a motion controlling section providing kinesthetic feedback and tactile feedback to a hand of a user; a system controlling section detecting motions of the hand, and providing an integrated haptic feedback control signal to the motion controlling section; and a display section visually rendering a graphic object following the detected motions of the hand. The motion controlling section includes: a kinesthesia actuator including a magnetorheological fluid, for providing the kinesthetic feedback to the hand; a tactile sensation actuator including a soft thin-film-type tactile sensation providing array, for providing the tactile feedback to the hand; and a local controlling section controlling the kinesthesia actuator and the tactile sensation actuator.

According to an embodiment of the present invention, the kinesthesia actuator and the tactile sensation actuator may be disposed on at least two fingers of the hand.

The tactile sensation actuator may include: a case covering side surfaces and a bottom surface of the soft thin-film-type tactile sensation providing array; a friction section disposed on an outer side surface of the case; and a receptacle containing the soft thin-film-type tactile sensation providing array, the case, and the friction section.

The soft thin-film-type tactile sensation providing array may include: a first substrate on which a first electrode is disposed; a second substrate facing the first substrate, with a second electrode being disposed on the second substrate; and a plurality of supports disposed between the first substrate and the second substrate. The plurality of supports defines a plurality of cavities between the first substrate and the second substrate.

The kinesthesia actuator may include: a plurality of unit breakers arranged in a single direction, each of the plurality of unit breakers including the magnetorheological fluid and a rotary shaft; connecting blocks each disposed between adjacent unit breakers of the plurality of unit breakers; and link plates connecting the rotary shafts adjacent unit breakers of the plurality of unit breakers.

Each of the plurality of unit breakers may include: a first annular through bearing including the magnetorheological fluid; a case member covering an outer side surface of the thrust bearing; and an annular coil arranged in a second annular shape along an outer side surface of the case member. The rotary shaft is coupled on top of the thrust bearing, and rotates using rotating force supplied from the thrust bearing.

The thrust bearing may include: an upper bearing cover having a circular first guide groove; a lower bearing cover having a second guide groove overlapping the first guide groove; and a plurality of bearing balls disposed between the upper bearing cover and the lower bearing cover, and adjoining at least a portion of the first and second guide grooves. The magnetorheological fluid is disposed along with @the plurality of bearing balls in a space between the upper bearing cover and the lower bearing cover.

The integrated haptic feedback simulating device using a kinesthesia providing module including a magnetorheological fluid and a thin-film-type tactile sensation providing module proposed by the present invention includes the motion controlling section providing kinesthetic feedback and tactile feedback to a hand of a user, the system controlling section detecting motions of the hand and providing an integrated haptic feedback control signal to the motion controlling section, and the display section visually rendering a graphic object according to the detected motions of the hand. Accordingly, the integrated haptic feedback simulating device can provide a synesthetic haptic feedback to the user in cooperation with a graphic interface displayed on the display section, thereby increasing the virtuality of the graphic object simulated on the display section.

In addition, the integrated haptic feedback simulating device using a kinesthesia providing module including a magnetorheological fluid and a thin-film-type tactile sensation providing module can be applied to educational programs that require visual, tactile, and kinesthetic feedback, thereby maximizing educational effects to the user.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION

Reference will now be made in detail to exemplary embodiments of the present invention in conjunction with the accompanying drawings so that a person skilled in the art to which the present invention relates can easily put the present invention into practice. In the following description of the present invention, detailed descriptions of known functions and components incorporated herein will be omitted in the case in which they may render the subject matter of the present invention unclear. Throughout this document, reference should be made to the drawings, in which the same reference numerals and signs may be used throughout the different drawings to designate the same or similar components.

It will be understood that when an element is referred to as being "connected to" or "coupled to" another element, not only can it be "directly connected" or "coupled to" the other element, but also can it be "indirectly connected or coupled to" the other element via an "intervening" element. The word "comprise," and variations such as "comprises" or "comprising," will be understood to imply the inclusion of stated elements but not the exclusion of any other elements unless explicitly described to the contrary.

Figure 1:
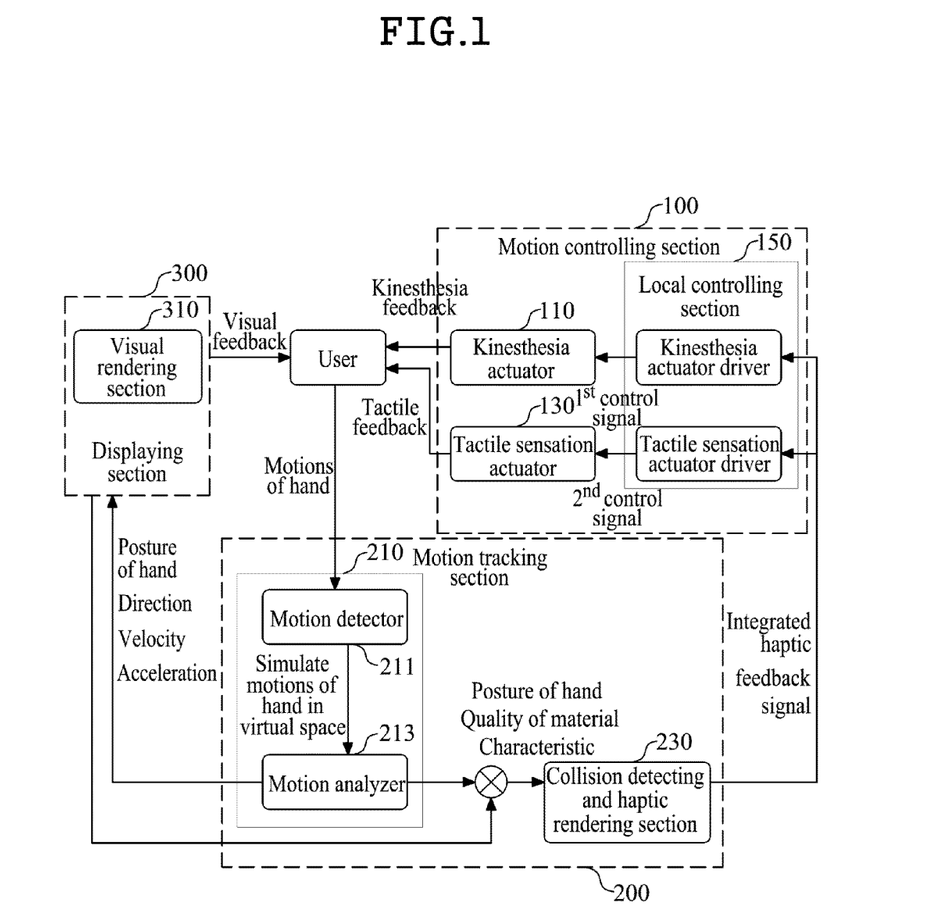
FIG. 1 is a block diagram illustrating the configuration of an integrated haptic feedback simulating device using a kinesthesia providing module including a magnetorheological fluid and a thin-film-type tactile sensation providing module according to an exemplary embodiment of the present invention.

FIG. 1 is a block diagram illustrating the configuration of an integrated haptic feedback simulating device using a kinesthesia providing module including a magnetorheological fluid and a thin-film-type tactile sensation providing module according to an exemplary embodiment of the present invention. As illustrated in FIG. 1, the integrated haptic feedback simulating device using a kinesthesia providing module including a magnetorheological fluid and a thin-film-type tactile sensation providing module according to the present embodiment includes a motion controlling section 100, a system controlling section 200, and a display section 300. The motion controlling section 100 includes a kinesthesia actuator 110, a tactile sensation actuator 130, and a local controlling section 150. The system controlling section 200 includes a motion tracking section 210 and a collision@ detecting and haptic rendering section 230. The motion tracking section 210 includes a motion detector 211 and a motion analyzer 213. The display section 300 includes a visual rendering section 310.

As illustrated in FIG. 1, the motion of a hand of a user can be detected by the motion detector 211 of the motion tracking section 210. The motion of the hand detected in this manner can be simulated as the motion of the hand in a virtual space by the motion analyzer 213. Information, as of the posture, direction, velocity, or acceleration of the hand, according to the motion of the virtual hand that is simulated as above can be displayed to the user by the visual rendering section 310 of the display section 300. In addition, when an image object displayed on the display section 300 collides against an image object of the virtual hand according to the motion of the virtual hand (i.e. a visual feedback), information, as of the posture of the hand at an event of collision, or the quality of the material of the colliding image object, is processed by the collision detecting and haptic rendering section 230, such that the information can be provided in the form of an integrated haptic feedback signal to the motion controlling section 100.

The local controlling section 150 of the motion controlling section 100 can convert the integrated haptic feedback signal into a first control signal generated from a kinesthesia actuator driver and a second control signal generated from a tactile sensation actuator driver. The first control signal generated in this manner is provided to the kinesthesia actuator 110, allowing the kinesthesia actuator 110 to provide kinesthetic feedback to the user. The second control signal generated in this manner is provided to the tactile sensation actuator 130, allowing the tactile sensation actuator 130 to provide tactile feedback to the user.

Reference will now be made in greater detail to each component of the integrated haptic feedback simulating device using a kinesthesia providing module including a magnetorheological fluid and a thin-film-type tactile sensation providing module according to the present embodiment.

Figure 2:
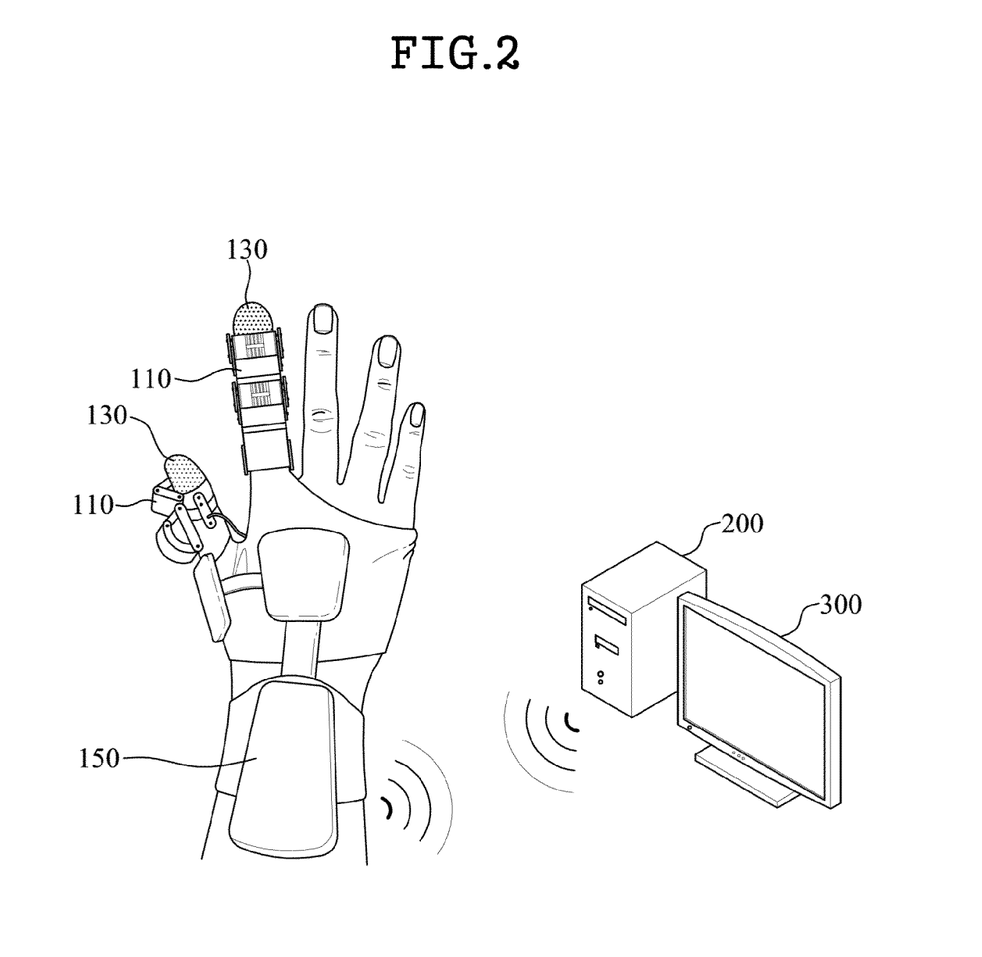
FIG. 2 is a schematic view illustrating the configuration of the integrated haptic feedback simulating device using a kinesthesia providing module including a magnetorheological fluid and a thin-film-type tactile sensation providing module according to the exemplary embodiment of the present invention.

FIG. 2 is a schematic view illustrating the configuration of the integrated haptic feedback simulating device using a kinesthesia providing module including a magnetorheological fluid and a thin-film-type tactile sensation providing module according to the exemplary embodiment of the present invention. As illustrated in FIG. 2, the kinesthesia actuator 110 and the tactile sensation actuator 130 of the motion controlling section 100 can be disposed on at least two fingers of the user. For example, the tactile sensation actuators 130 are disposed on the tips of the thumb and the index finger of the user, and the kinesthesia actuators 110 are disposed on the sections of the thumb and the index finger of the user.

The tactile sensation actuator 130 and the kinesthesia actuator 110 can be electrically connected to the local controlling section 150. The local controlling section 150 can be disposed on, for example, the back of the hand or the wrist of the user. The kinesthesia actuator driver of the local controlling section 150 can generate a first control signal for controlling the operation of the kinesthesia actuator 110. In addition, the tactile actuator driver of the local controlling section 150 can generate a second control signal for controlling the operation of the tactile sensation actuator 130. In this case, the local controlling section 150 can generate the first and second control signals based on an integrated haptic feedback signal provided from the system controlling section 200.

Although it was illustrated in FIG. 2 that the system controlling section 200 and the local controlling section 150 are provided separately from each other and are electrically connected to each other, this is illustrative only. The motion detector 211 of the system controlling section 200 may be disposed on the back of the hand or the wrist of the user together with the local controlling section 150 in order to detect the motion of the hand of the user.

Figure 3A:
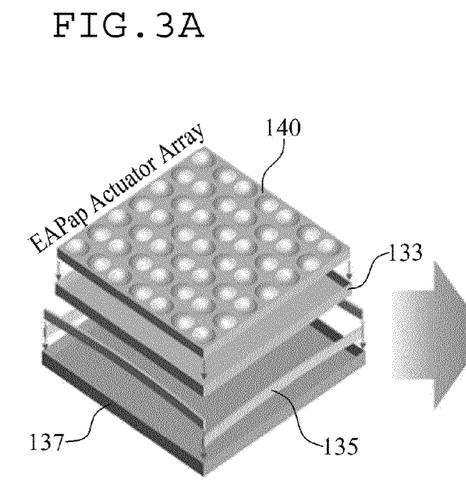
FIG. 3A and FIG. 3B illustrate the configuration of the thin-film-type tactile sensation providing module of the integrated haptic feedback simulating device using a kinesthesia providing module including a magnetorheological fluid and a thin-film-type tactile sensation providing module according to the exemplary embodiment of the present invention.
Figure 3B:
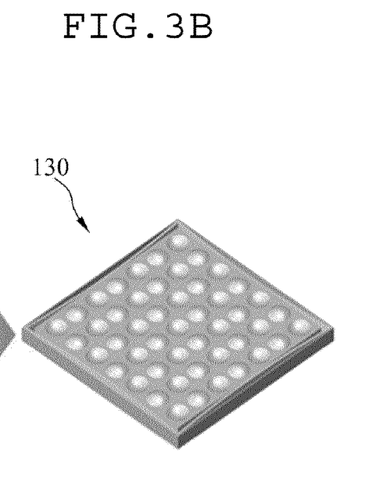

FIG. 3A and FIG. 3B illustrate the configuration of the thin-film-type tactile sensation providing module of the integrated haptic feedback simulating device using a kinesthesia providing module including a magnetorheological fluid and a thin-film-type tactile sensation providing module according to the exemplary embodiment of the present invention. FIG. 3A is an exploded view of the tactile sensation actuator 130, and FIG. 3B is an assembled view of the tactile sensation actuator 130. As illustrated in FIG. 3A and FIG. 3B, the tactile sensation actuator 130 includes a thin-film-type tactile sensation providing array 140, a case 133, friction sections 135, and a receptacle 137.

The thin-film-type tactile sensation providing array 140 is a section providing tactile feedback to a finger of the user. The thin-film-type tactile sensation providing array 140 includes substrates that face each other and electrodes disposed on the substrates. The thin-film-type tactile sensation providing array 140 will be described in greater detail later with reference to FIG. 4.

The case 133 covers the side surfaces and the bottom surface of the thin-film-type tactile sensation providing array 140. The friction sections 135 are disposed adjacent to the side surfaces of the case 133. For example, each of the friction sections 135 may be disposed on the corresponding side surface of the case 133. The friction sections 135 may be configured to generate a relatively large amount of frictional force to the surfaces that adjoin the outer side surfaces of the case 133. The receptacle 137 contains therein the thin-film-type tactile sensation providing array 140, the case 133, and the friction sections 135.

Figure 4:
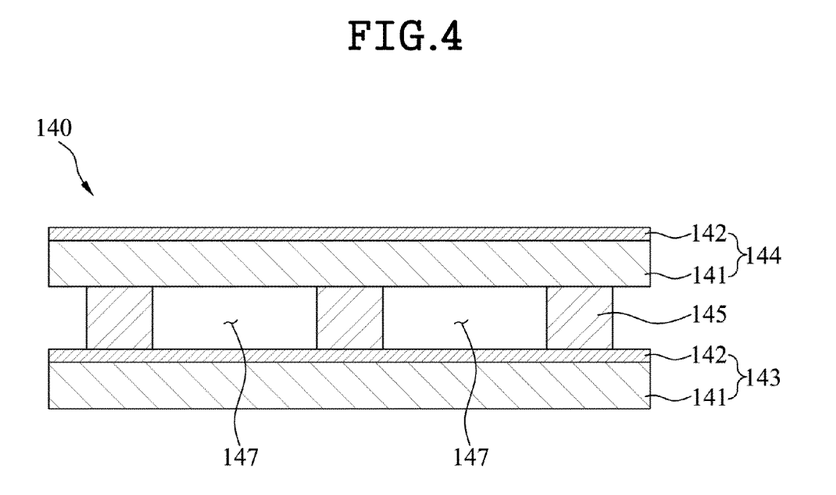
FIG. 4 illustrates the cross-section of the thin-film-type tactile sensation providing module of the integrated haptic feedback simulating device using a kinesthesia providing module including a magnetorheological fluid and a thin-film-type tactile sensation providing module according to the exemplary embodiment of the present invention.

FIG. 4 illustrates the cross-section of the thin-film-type tactile sensation providing module of the integrated haptic feedback simulating device using a kinesthesia providing module including a magnetorheological fluid and a thin-film-type tactile sensation providing module according to the exemplary embodiment of the present invention. As illustrated in FIG. 4, the thin-film-type tactile sensation providing array 140 includes a first substrate 143, a second substrate 144, and a plurality of supports 145. Each of the first substrate 143 and the second substrate 144 includes a base substrate 141 and an electrode 142 disposed on the base substrate 141. The plurality of supports 145 is disposed between the first substrate 143 and the second substrate 144. Since the plurality of supports 145 is disposed between the first substrate 143 and the second substrate 144, a plurality of cavities 147 is defined between the first substrate 143 and the second substrate 144. The cavities 147 may be arranged in, for example, a 7×7 array when viewed on the plane.

As an electric field is generated on the first substrate 143 and the second substrate 144 in response to a voltage applied to the electrodes 142 on the first substrate 143 and the second substrate 144, some portions of the base substrates 141 may be warped. As the portions of the base substrates 141 spaced apart from each other by means of the supports 145 are warped, tactile feedback can be provided to the hand of the user.

For example, when attractive force acts between the first substrate 143 and the second substrate 144, the portions of the base substrate 141 of the second substrate 144 overlapping the cavities 147 may be warped concavely toward the first substrate 143. In addition, when repulsive force acts between the first substrate 143 and the second substrate 144, the portions of the base substrate 141 of the second substrate 144 overlapping the cavities 147 may be warped convexly away from the first substrate 143. When voltages are applied to the electrodes 142 such that the attractive force and the repulsive force are formed iteratively according to a preset frequency, the tactile sensation feedback from the thin-film-type tactile sensation providing array 140 can be provided to the hand of the user.

Figure 5:
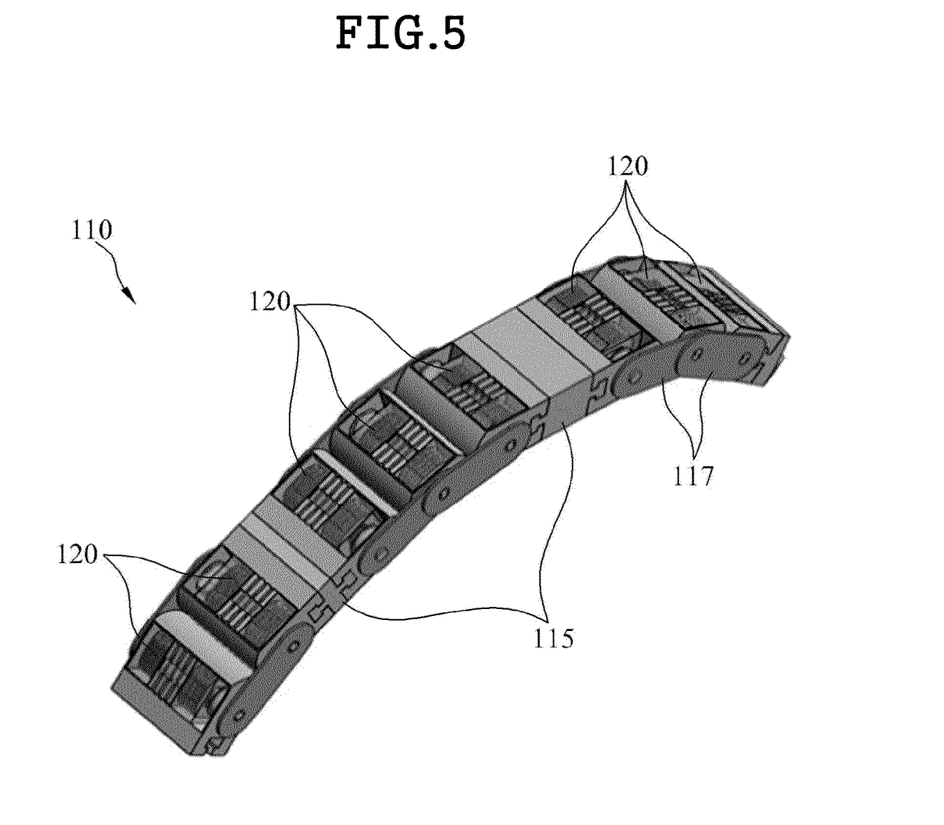
FIG. 5 illustrates the configuration of the kinesthesia providing module of the integrated haptic feedback simulating device using a kinesthesia providing module including a magnetorheological fluid and a thin-film-type tactile sensation providing module according to the exemplary embodiment of the present invention.

FIG. 5 illustrates the configuration of the kinesthesia providing module of the integrated haptic feedback simulating device using a kinesthesia providing module including a magnetorheological fluid and a thin-film-type tactile sensation providing module according to the exemplary embodiment of the present invention. As illustrated in FIG. 5, the kinesthesia actuator 110 includes a plurality of unit breakers 120, a plurality of connecting blocks 115, and a plurality of link plates 117. The plurality of unit breakers 120 is arranged in a single direction. Each of the plurality of connecting blocks 115 is disposed between the two adjacent unit breakers of the plurality of unit breakers 120. The plurality of link plates 117 connects rotary shafts 550 of the adjacent unit breakers of the plurality of unit breakers 120. As the plurality of unit breakers 120, each of which generates rotating force, is connected in the single direction, kinesthesia, such as a gripping sensation or a sensation of pressing a button, in response to a bending motion of the finger of the user can be provided to the user.

Figure 6:
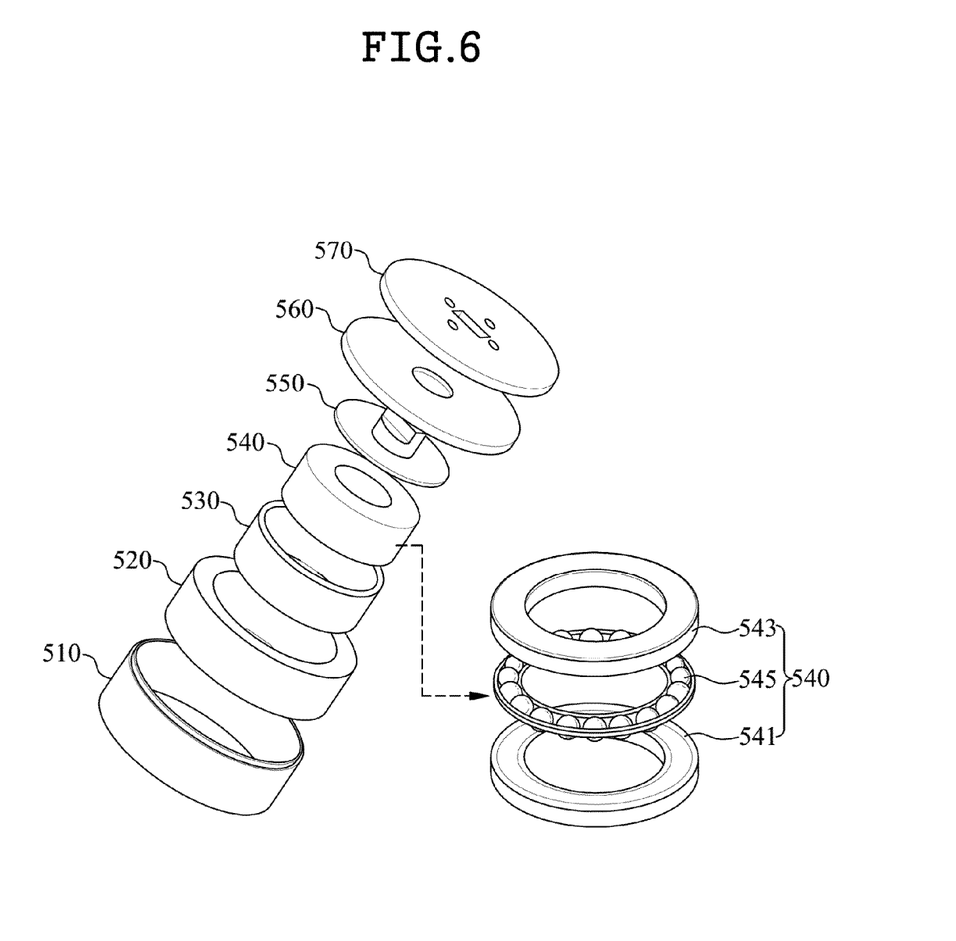
FIG. 6 illustrates a unit breaker of the kinesthesia providing module of the integrated haptic feedback simulating device using a kinesthesia providing module including a magnetorheological fluid and a thin-film-type tactile sensation providing module according to the exemplary embodiment of the present invention.

FIG. 6 illustrates a single unit breaker of the kinesthesia providing module of the integrated haptic feedback simulating device using a kinesthesia providing module including a magnetorheological fluid and a thin-film-type tactile sensation providing module according to the exemplary embodiment of the present invention. As illustrated in FIG. 6, the unit breaker 120 includes a thrust bearing 540, a case member 530, an annular coil 520, and a rotary shaft 550. The unit breaker 120 further includes a housing 510, an actuator cover 560, and a handle 570.

The thrust bearing 540 is in a first annular shape, and includes a magnetorheological fluid (MR fluid). The thrust bearing 540 can generate rotating force in response to the magnetorheological fluid flowing and being compressed. The magnetorheological fluid may be a colloidal fluid that solidifies when exposed to a magnetic field while normally maintaining the properties of liquid. The magnetorheological fluid may be formed by adding magnetic particles into carrier oil.

The magnetorheological fluid is characterized by being stable, since the magnetorheological fluid passively operates, for example, solidifies, when exposed to a magnetic field. In addition, the characteristics of the magnetorheological fluid include a rapid response rate of, for example, 1 ms (millisecond), high resistance at low power, and the ability to control force in a wide range. Furthermore, the magnetorheological fluid can be advantageously designed according to a variety of sizes or shapes of containers containing the magnetorheological fluid.

The thrust bearing 540 includes an upper bearing cover 543 having a circular first guide groove, a lower bearing cover 541 having a second guide groove overlapping the first guide groove, and a plurality of bearing balls 545 disposed between the upper bearing cover 543 and the lower bearing cover 541. The plurality of bearing balls 545 adjoins at least a portion of the first and second guide grooves. The magnetorheological fluid may be disposed along with the bearing balls 545 in the space between the upper bearing cover 543 and the lower bearing cover 541. The plurality of bearing balls 545 may be disposed continuously along the first guide groove of the upper bearing cover 543 and the second guide groove of the lower bearing cover 541.

The bearing balls 545 disposed between the upper bearing cover 543 and the lower bearing cover 541 can perform rotational motions and translation motions along the first and second guide grooves. For example, the bearing balls 545 can perform rotational motions along axes perpendicular to the direction in which the first and second guide grooves extend. In addition, the bearing balls 545 can perform translational motions along the direction in which the first and second guide grooves extend.

In response to rotational motions or translational motions of the bearing balls 545 of the thrust bearing 540 in this manner, the magnetorheological fluid 547 can operate in a flowing mode or a compressing mode. For example, when the bearing balls 545 perform translational motions due to a magnetic field generated in the direction perpendicular to the lower bearing cover 541 and the upper bearing cover 543 of the thrust bearing 540, pressure can be applied to the magnetorheological fluid in the direction in which the bearing balls 545 proceed, thereby causing the magnetorheological fluid to operate in the flowing mode or the compressing mode according to the direction in which the bearing balls 545 proceed.

The case member 530 covers the outer side surface of the thrust bearing 540, and is in a hollow cylindrical shape. According to some embodiments, the case member 530 may be configured to further cover the bottom surface of the thrust bearing 540.

The annular coil 520 may be disposed in a second annular shape along the outer circumference of the case member 530. The annular coil 520 may include a plurality of coils surrounding the side surface of the case member 530. The second annular shape of the circular coil 520 may have a concentric shape, the center of which is identical to that of the first annular shape of the thrust bearing 540.

The rotational shaft 550 is coupled on top of the thrust bearing 540, such that the rotational shaft 550 can be provided with rotating force from the thrust bearing 540. The rotational shaft 550 includes a plate disposed on the thrust bearing 540 and a shaft body protruding from the center of the plate. The rotational shaft 550 can be provided with rotating force from the thrust bearing 540 when rotating about the rotational axis.

The housing 510 coverts the outer side surface and the bottom surface of the circular coil 520. The housing 510 includes a sidewall portion extending along the outer side surface of the circular coil 520 and a bottom portion supporting the circular coil 520.

The actuator cover 560 is disposed on top of the rotary shaft 550. The actuator cover 560 can be in the shape of a plate having a hole through which at least a portion of the protruding shaft body of the rotary shaft 550 can pass. The actuator cover 560 is coupled to the housing 510 such that the actuator cover 560 can protect the rotary shaft 550, the thrust bearing 540, the case member 530, and the circular coil 520.

The handle 570 is disposed on the actuator cover 560. The handle 570 includes a fixed recess fixed to the protruding shaft body of the rotary shaft 550. For example, when the end portion of the protruding shaft body of the rotary shaft 550 is in a rectangular shape, the fixed recess of the handle 570 may be a rectangular hole conforming to the rectangular shape.

As described above, the integrated haptic feedback simulating device using a kinesthesia providing module including a magnetorheological fluid and a thin-film-type tactile sensation providing module proposed by the present invention includes the motion controlling section 100 providing kinesthetic feedback and tactile feedback to the hand of the user, a system controlling section 200 detecting the motion of the hand and providing an integrated haptic feedback control signal to the motion controlling section 100, and a display section 300 visually rendering a graphic object according to the detected motion of the hand. Accordingly, the integrated haptic feedback simulating device can provide a synesthetic haptic feedback to the user in cooperation with a graphic interface displayed on the display section, thereby increasing the virtuality of the graphic object simulated on the display section 300.

In addition, the integrated haptic feedback simulating device can be applied to educational programs that require visual, tactile, and kinesthetic feedback, thereby maximizing educational effects to the user.

Although the exemplary embodiments of the present invention have been described for illustrative purposes, those skilled in the art will appreciate that various modifications, additions and substitutions are possible, without departing from the scope and spirit of the present invention as disclosed in the accompanying claims.

What is claimed is:

1. An integrated haptic feedback simulating device comprising:
   a motion controlling section providing kinesthetic feedback and tactile feedback to a hand of a user;
   a system controlling section detecting motions of the hand, and providing an integrated haptic feedback control signal to the motion controlling section; and
   a display section visually rendering a graphic object following the detected motions of the hand of the user,
   wherein the motion controlling section comprises:
   a kinesthesia actuator comprising a magnetorheological fluid, for providing the kinesthetic feedback to the hand of the user;
   a tactile sensation actuator comprising a soft thin-film-type tactile sensation providing array, for providing the tactile feedback to the hand of the user; and
   a local controlling section controlling the kinesthesia actuator and the tactile sensation actuator,
   wherein the kinesthesia actuator and the tactile sensation actuator are disposed on at least two fingers of the hand of the user, and
   wherein the kinesthesia actuator comprises a plurality of unit breakers arranged in a single direction, each of the plurality of unit breakers comprising the magnetorheological fluid and a rotary shaft.

2. The integrated haptic feedback simulating device according to claim 1, wherein the tactile sensation actuator comprises:
   a case covering side surfaces and a bottom surface of the soft thin-film-type tactile sensation providing array;
   a friction section disposed on an outer side surface of the case; and
   a receptacle containing the soft thin-film-type tactile sensation providing array, the case, and the friction section.

3. The integrated haptic feedback simulating device according to claim 1, wherein the soft thin-film-type tactile sensation providing array comprises:
   a first substrate on which a first electrode is disposed;
   a second substrate facing the first substrate, with a second electrode being disposed on the second substrate; and
   a plurality of supports disposed between the first substrate and the second substrate,
   wherein the plurality of supports defines a plurality of cavities between the first substrate and the second substrate.

4. The integrated haptic feedback simulating device according to claim 1, wherein the kinesthesia actuator further comprises:
   connecting blocks each disposed between adjacent unit breakers of the plurality of unit breakers; and
   link plates connecting the rotary shafts adjacent unit breakers of the plurality of unit breakers.

5. The integrated haptic feedback simulating device according to claim 4, wherein each of the plurality of unit breakers comprises:
   a first annular thrust bearing comprising the magnetorheological fluid;
   a case member covering an outer side surface of the thrust bearing; and
   an annular coil arranged in a second annular shape along an outer side surface of the case member, wherein the rotary shaft is coupled on top of the thrust bearing, and rotates using rotating force supplied from the thrust bearing.

6. The integrated haptic feedback simulating device according to claim 5, wherein the thrust bearing comprises:
   an upper bearing cover having a circular first guide groove;
   a lower bearing cover having a second guide groove overlapping the first guide groove; and
   a plurality of bearing balls disposed between the upper bearing cover and the lower bearing cover, and adjoining at least a portion of the first and second guide grooves,
   wherein the magnetorheological fluid is disposed along with the plurality of bearing balls in a space between the upper bearing cover and the lower bearing cover.

* * * * *